April 4, 1939.  F. SMARDO  2,153,162
TARGET DEVICE
Filed Oct. 18, 1937  5 Sheets-Sheet 1
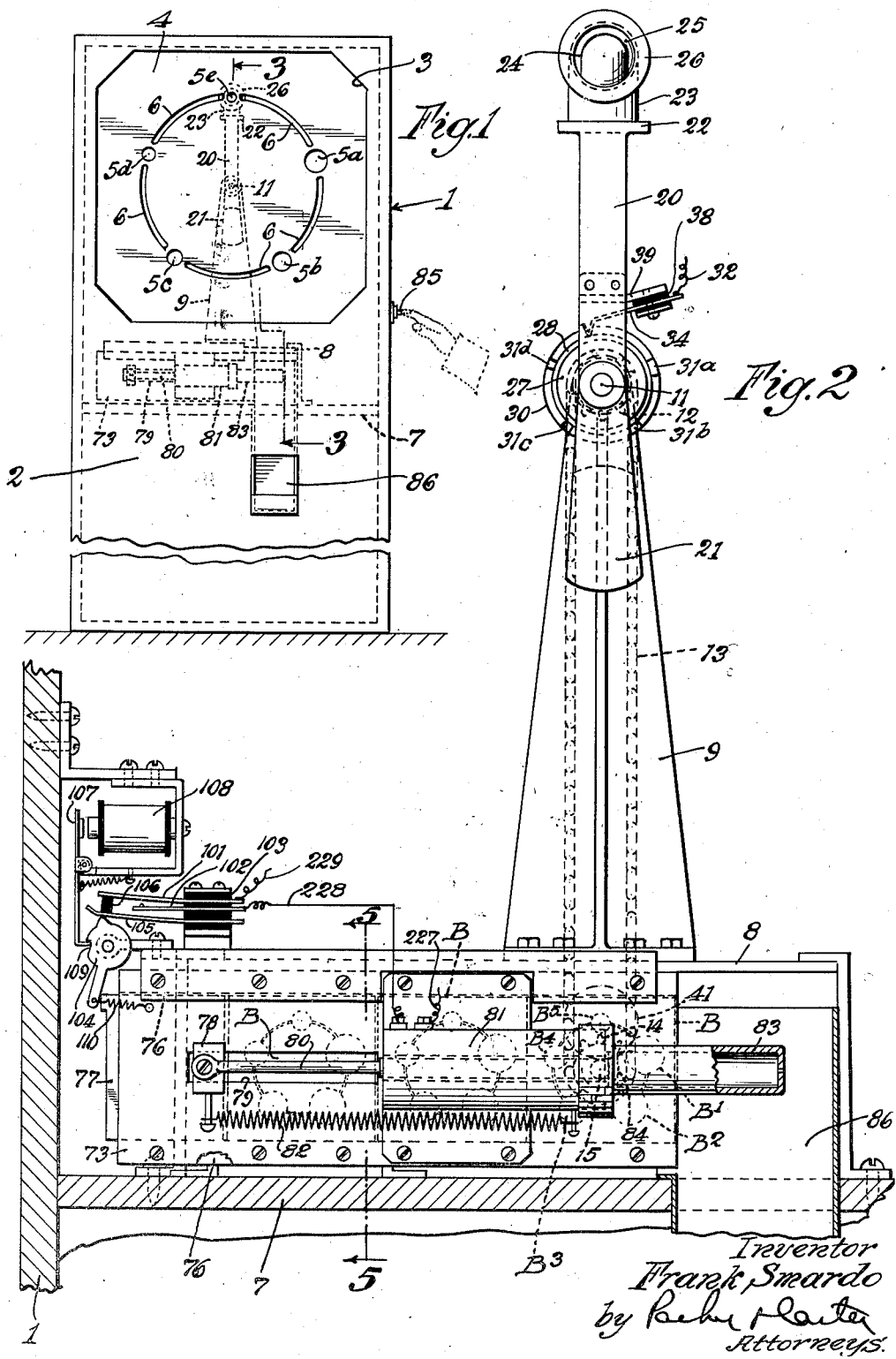
Inventor
Frank Smardo
by Recher & Carter
Attorneys.

April 4, 1939.  F. SMARDO  2,153,162
TARGET DEVICE
Filed Oct. 18, 1937  5 Sheets-Sheet 2
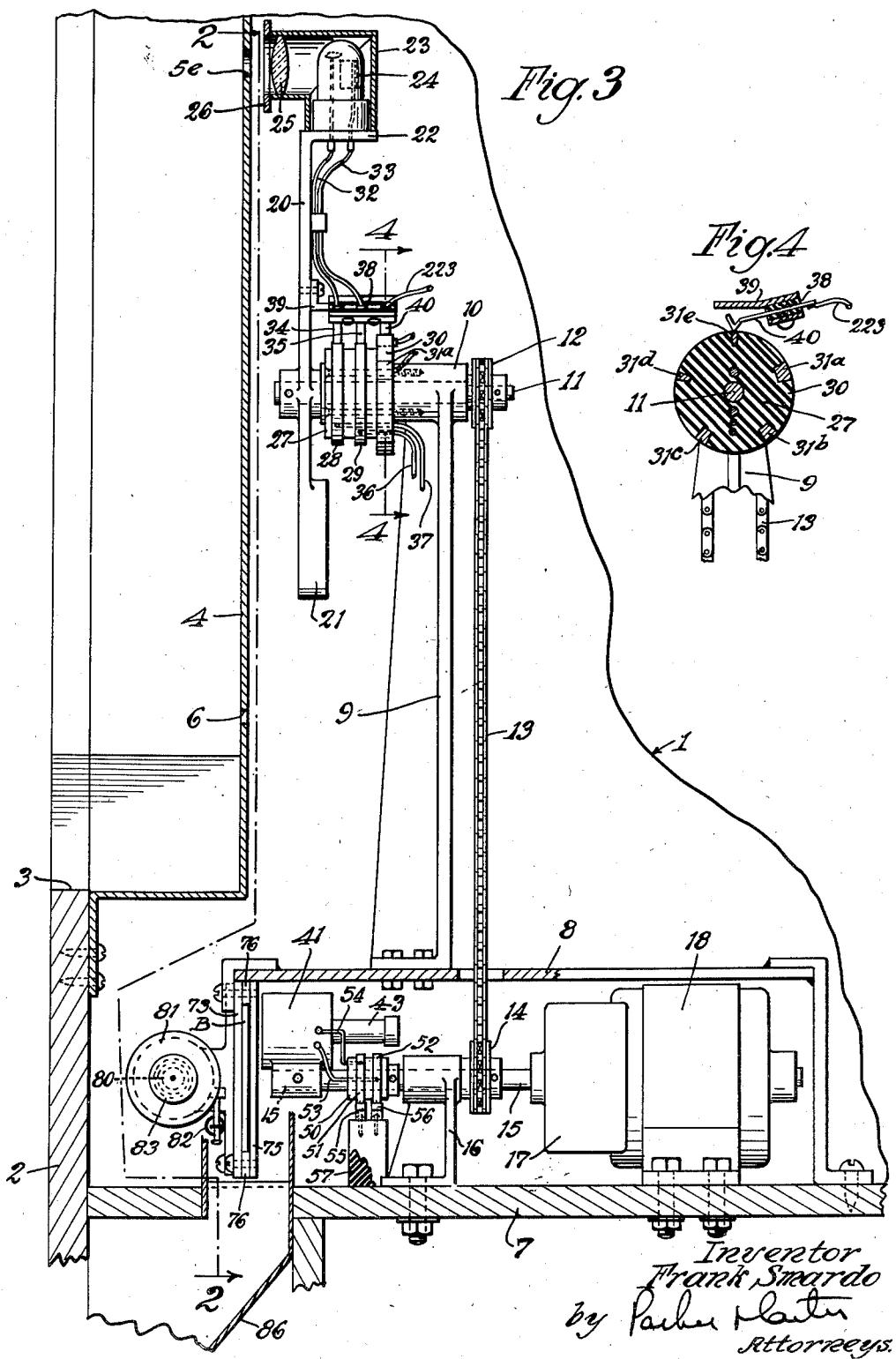
Inventor
Frank Smardo
by Parker Carter
Attorneys.

April 4, 1939.  F. SMARDO  2,153,162
TARGET DEVICE
Filed Oct. 18, 1937   5 Sheets-Sheet 3

Inventor
Frank Smardo
by Parker Porter
Attorneys

April 4, 1939.  F. SMARDO  2,153,162
TARGET DEVICE
Filed Oct. 18, 1937   5 Sheets-Sheet 4
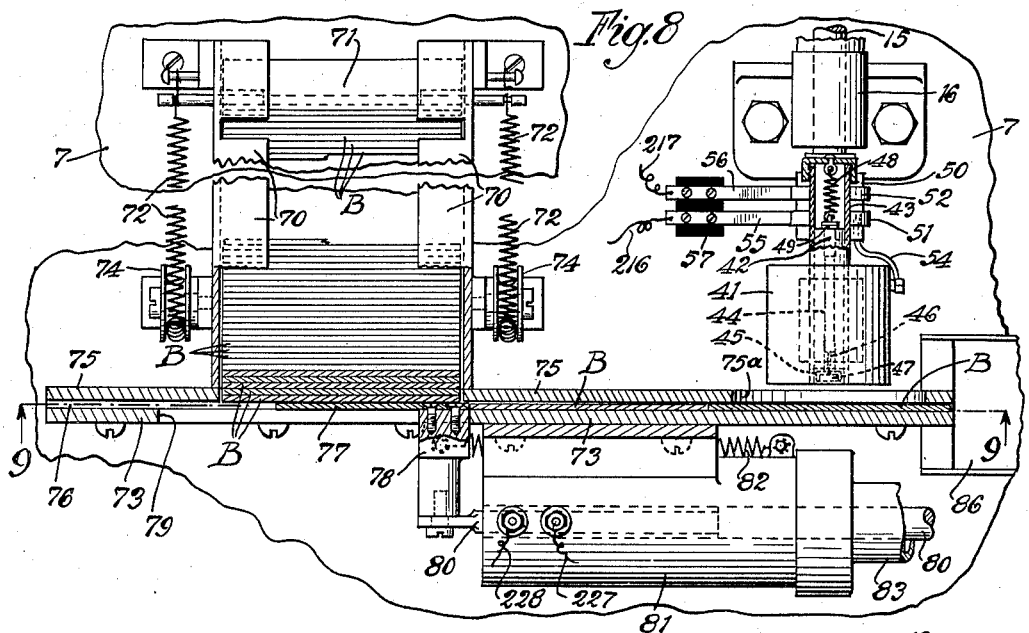
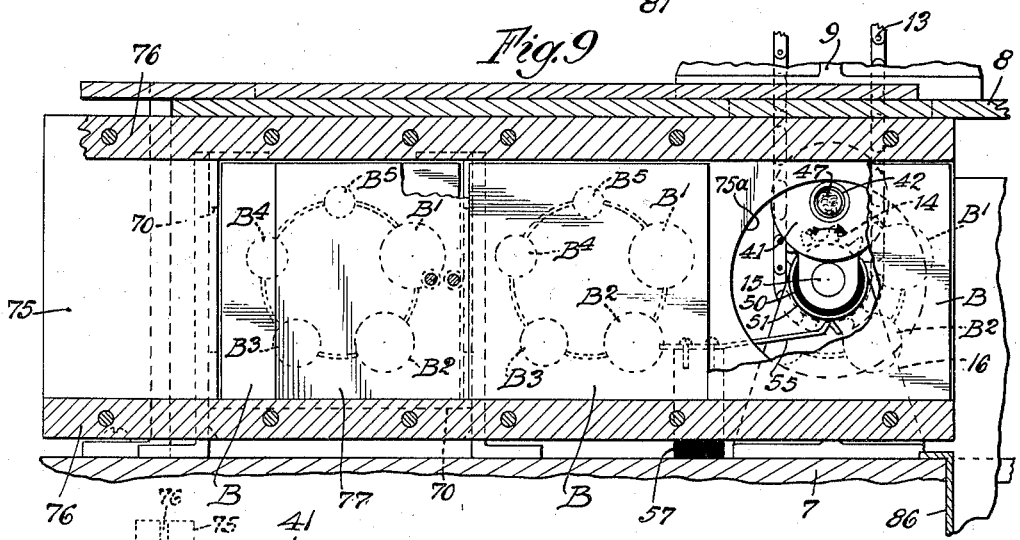
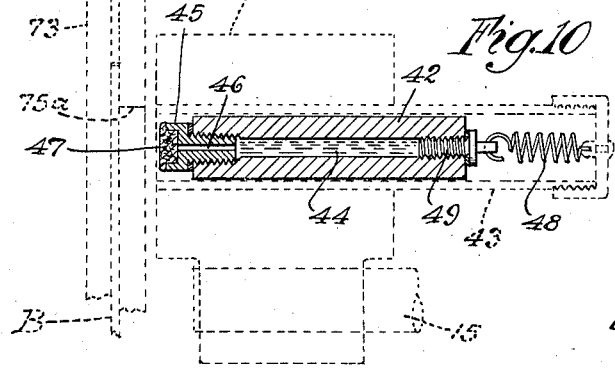
Inventor
Frank Smardo
by Parker Plantes
Attorneys.

April 4, 1939. F. SMARDO 2,153,162
TARGET DEVICE
Filed Oct. 18, 1937 5 Sheets-Sheet 5
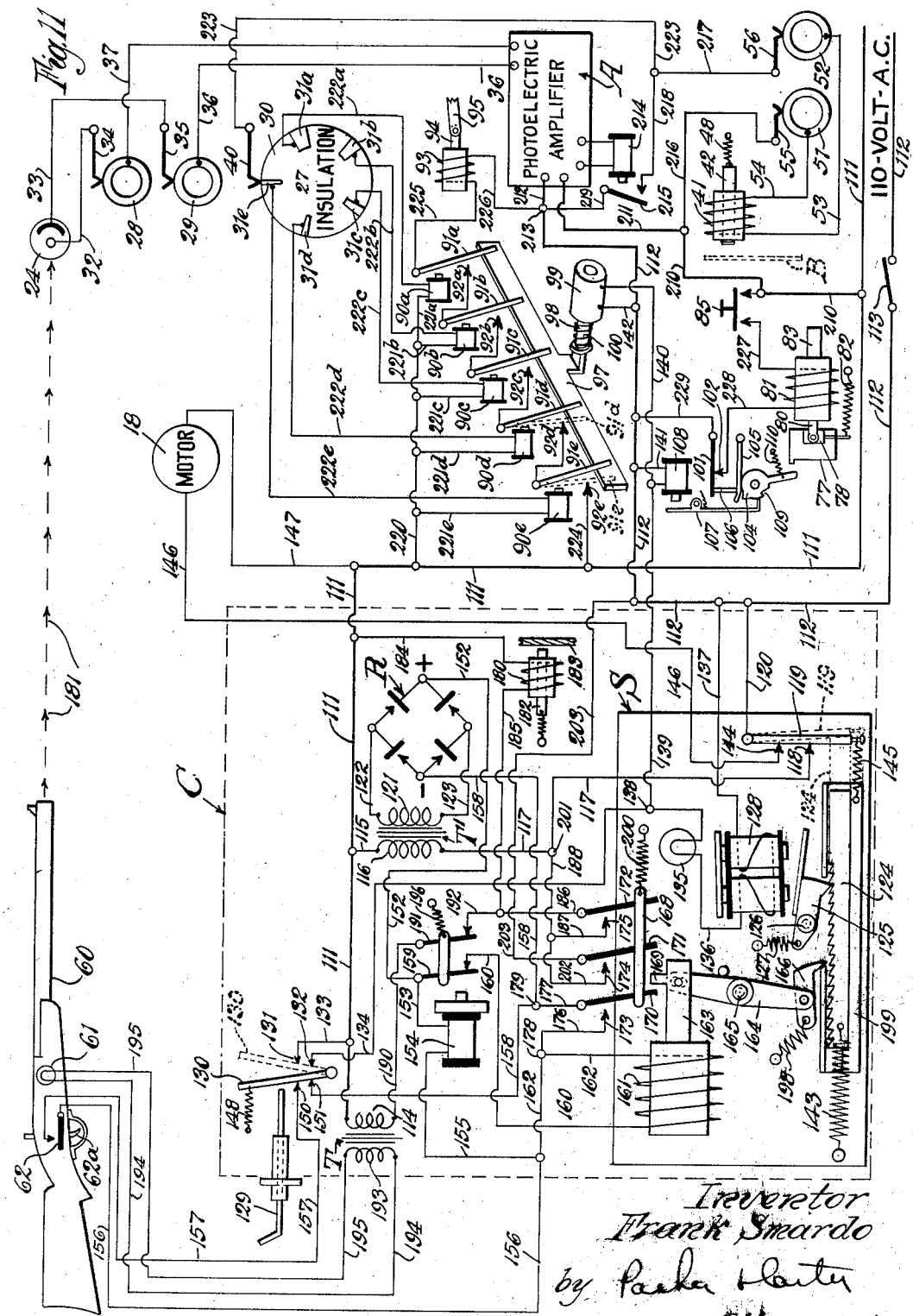

Patented Apr. 4, 1939

2,153,162

UNITED STATES PATENT OFFICE 2,153,162

TARGET DEVICE

Frank Smardo, Chicago, Ill., assignor to Phoebus Corporation, Chicago, Ill., a corporation of Illinois Application October 18, 1937, Serial No. 169,596

16 Claims. (Cl. 273—101.1)

My invention relates to an improvement in target devices and particularly in target devices in which the target operates by means of a photosensitive element.

One purpose is the provision of such a target device in which the score is recorded in visual form upon a score slip, token, sheet or the like.

Another purpose is the provision of means for inking a score indicator in direct relation to the accuracy of the shooting of the operator.

Another purpose is the provision of means for handling the score indicating devices, for moving them into position to be inked or otherwise marked, and for discharging them from the machine after the score is recorded.

Another purpose is the provision of improved means for delivering a prize in response to accuracy in shooting.

Another purpose is the provision of an improved target rotor in which a photosensitive cell is mounted on a rotatable member or arm.

Other purposes will appear from time to time in the course of the specification and claims.

I illustrate my invention more or less diagrammatically in the accompanying drawings wherein:

Figure 1 is a front elevation;

Figure 2 is a section on the line 2—2 of Figure 3;

Figure 3 is a section on the line 3—3 of Figure 1, with parts omitted;

Figure 4 is a section on the line 4—4 of Figure 3;

Figure 8 is a section on the line 8—8 of Figure 2;

Figure 9 is a section on the line 9—9 of Figure 8;

Figure 10 is a section through the inking or marking device; and

Figure 11 is a wiring diagram.

Like parts are indicated by like symbols throughout the specification and drawings.

Figure 5:
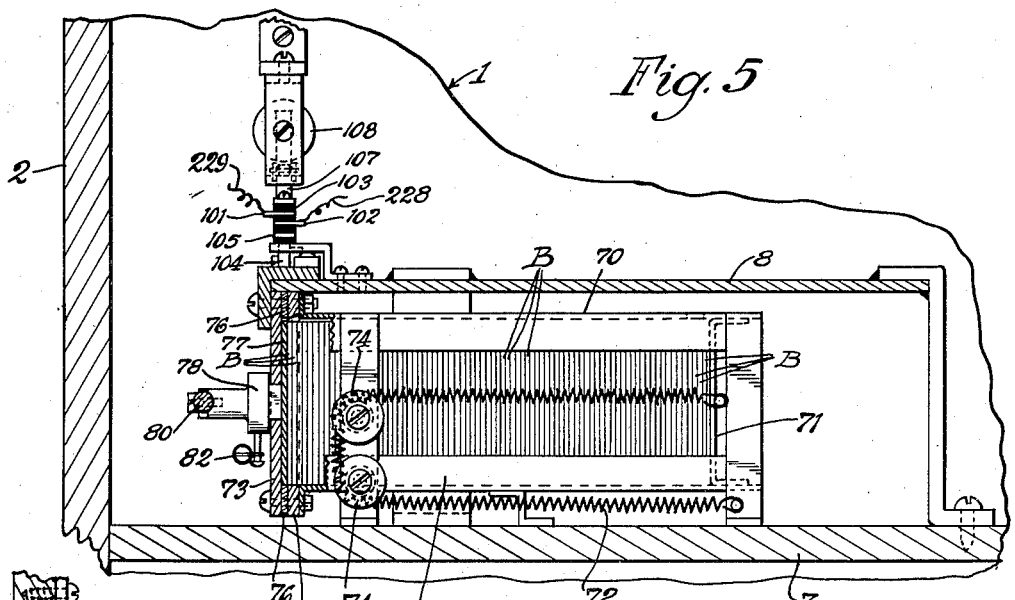
Figure 5 is a section on the line 5—5 of Figure 2.

Referring to the drawings, 1 generally indicates any suitable cabinet having a front wall 2 provided with an aperture 3 in which is positioned a fixed target member 4 which may be of sheet metal or cardboard or any other suitable material and is shown as penetrated by a plurality of generally circular apertures 5a, 5b, 5c, 5d and 5e of varying diameters. These apertures are arranged in a circle and have between them arcuate slots 6.

7 indicates any suitable supporting shelf upon which is mounted any suitable support 8 upon which in turn is an upwardly extending bracket 9 terminating in a transverse hub 10 generally perpendicular to the face of the member 4 and having its center preferably concentric with the arcs 6. Mounted in the hub 10 is a rotatable shaft 11 carrying a sprocket 12. About this sprocket passes a drive chain 13 which in turn passes about the sprocket 14 on the shaft 15 which is rotatably mounted in a bracket 16 on the member 7. The shaft 15 is driven from any suitable gear reduction or speed reducer 17 from the motor generally indicated at 18, which motor may also be mounted on the member 7 as shown for example in Figure 3. It will be understood, therefore, that the shafts 11 and 15 which are shown as parallel are rotated in unison in response to rotation of the motor 18, and the parts are so proportioned that the shafts rotate at the same rotational speed.

Mounted for rotation with the shaft 11 is the arm 20 having associated therewith the counterweight 21. At the outer end of the arm 20 is a shelf or flange 22 upon which is mounted a housing 23 in which is positioned any suitable photo cell or photoelectric element 24. 25 is a lens for concentrating light upon the cell and it will be understood that as the arm is rotated the lens 25 and cell 24 are alined with the arcuate slots 6 and with the various apertures 5a and following. In order to render the device more visible to the operator I may, if desired, employ a ring 26 surrounding the lens 25 or the outer end of the housing 23.

Mounted on the hub 10 is an insulating block or member 27 upon the exterior of which are two parallel conductive rings 28, 29. The block 27 is also provided with an enlarged flange 30 in which are a plurality of segmental contacts of various degrees of arc indicated in Figure 4 as 31a, 31b, 31c, 31d and 31e, and corresponding in their angle of arc to the various sizes of the apertures 5a and following. The rings 28 and 29 serve as means for maintaining a circuit which includes the photo cell 24. I illustrate for example the conductors 32 and 33 which are in circuit with the spring fingers or contacts 34 and 35 which wipe against the rings 28 and 29 and thus maintain a constant circuit through the photo cell 24. The circuit may be completed by conductors 36 and 37 which extend to the photoelectric amplifier indicated at A in the wiring diagram of Figure 11.

The fingers 34 and 35 may be mounted in insulating means 38 on any suitable bracket or arm 39 shown as secured to the arm 20. The conductive connection for the segments 31a and following will be later described in connection with the description of the wiring diagram of Figure 11. The spring finger 40 which wipes across the segments 31a and following is also mounted upon the bracket 39 in the insulating member 38. Thus as the arm 20 rotates a constant circuit is maintained through the photo cell and an intermittent circuit the purpose of which will later appear is maintained through the various segments 31a and following.

The shaft 15 which rotates in unison with the shaft 11 carries at its outer end the eccentrically located solenoid coil generally indicated as 41. Slidably mounted within said coil is the plunger generally indicated in Figure 10 as 42. This plunger slides in a guiding sleeve 43 fixed in relation to the coil 41. It includes a hollow center 44 which may be filled with ink and an inking plug at its forward end indicated at 45 having an ink passage 46 and a terminal inking pad 47. 48 is a spring which tends normally to hold the plunger in the position in which it is shown in Figure 10. It may be secured for example to the closure member 49 which confines the ink within the interior of the plunger body 42.

Mounted upon and rotating with the shaft 15 is an insulating plug or body 50 carrying contact rings 51, 52 which are connected to the solenoid coil 41 by the conductors 53, 54 and are engaged by wiping contacts or spring fingers 55, 56 mounted on an insulating block 57 on the base or shelf 7. Thus the solenoid coil is constantly included in a circuit which is ready to be closed by means elsewhere described and shown.

In further describing my invention it will be understood that the mechanism herein shown includes the fixed target member 4 with the apertures 5a and following of different sizes. The slots 6 may be used or dispensed with but the apertures are essential in the form of the device as shown in the drawings. The operator tests his marksmanship by employing a gun generally indicated as 60 which has an electric light source 61 and a trigger switch 62. It will be understood that when the operator pulls the trigger 62a he closes the switch 62 and thereby causes the light bulb 61 to be illuminated for an instant, thus projecting a flash of light toward the target which is intended to hit the photo cell 24 at a time when it is alined with one or another of the five apertures 5a and following.

Figure 7:
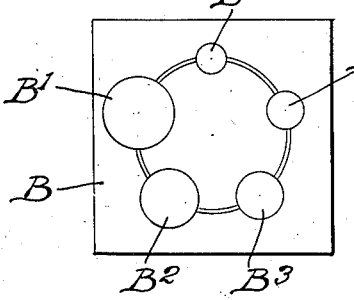
Figure 7 is a view of one of the indicators or target scores.

It is the purpose of the device to put a premium on accuracy in such fashion that if the user strikes the photo cell when it is centered within each one of the apertures 5a and following in succession, he scores a perfect score which is indicated by a corresponding positioning of the mark left by the solenoid plunger 42 on the score record illustrated in Figure 7. If the aim is off center, the mark left by the plunger will also be off center in the corresponding circle of the card B. The target marks B1, B2, B3, B4 and B5 correspond to the target apertures 5a, 5b, 5c, 5d and 5e, respectively, so the record member B accurately represents the aim of the user and the user has a permanent record of his score. The details of its delivery are discussed below.

It will be understood that a substantial number of the members B are located within guides 70 as shown for example in Figure 5 and are spring urged as by a plunger 71 and the springs 72 toward a forward limiting plate 73. The spring 72 is shown as a long coil spring passing around pulleys 74. Spaced rearwardly from the plate 73 is a companion plate 75, the two being separated by a space sufficient to permit the passage of the members B therebetween. The plates 73 and 75 are spaced apart by any suitable spacers 76, on the lower of which spacers the cards B ride.

As will be clear from Figure 8, the stack of cards B is spring thrust forwardly along the guides 70 and in Figure 8 the stack is shown as pushed against the laterally moving sliding or discharging plate 77. This plate 77 is mounted on any suitable shoe or actuating member 78 riding in the slot 79 and is controlled by the solenoid plunger structure 80 within the solenoid coil 81. A spring 82 normally holds the plunger in the position in which it is shown in Figure 8. The end of the solenoid plunger penetrates a dash pot 83 and is provided at its end with a dash pot cup 84 in order to check the unduly rapid return movement of the solenoid plunger.

After the user has completed his five allowed shots, five being preferable, one for each aperture, he presses the switch button 85. This completes a circuit through the solenoid coil 81 and causes the plunger to move to the left, to the position in which it is shown in Figure 2, in contrast to its previous position as shown in Figure 8. This causes the plate 77 to clear the stack of cards B which are thereupon moved forward one step by the action of the springs 72. The slide 77 on its return movement in response to the spring 82 thereupon picks up one of the cards B and moves it to the right, referring to the position of the parts in which they are shown in Figures 8 and 9.

Since, in the normal operation of the device, there are always two cards in the space between the plates 73 and 75, the result of this movement of the plunger is to eject the last card which is allowed thereupon to fall down the delivery chute 86. There will then again be two cards out of the stack, namely an intermediate card in neutral position, and the terminal card which, as shown in Figures 8 and 9, is alined with the shaft 15 and is ready to be inked or otherwise marked by the plunger 42. It will be observed, of course, that the plate 75 is apertured as at 75a to permit access of the printing plunger to the face of the target record card.

Figure 6:
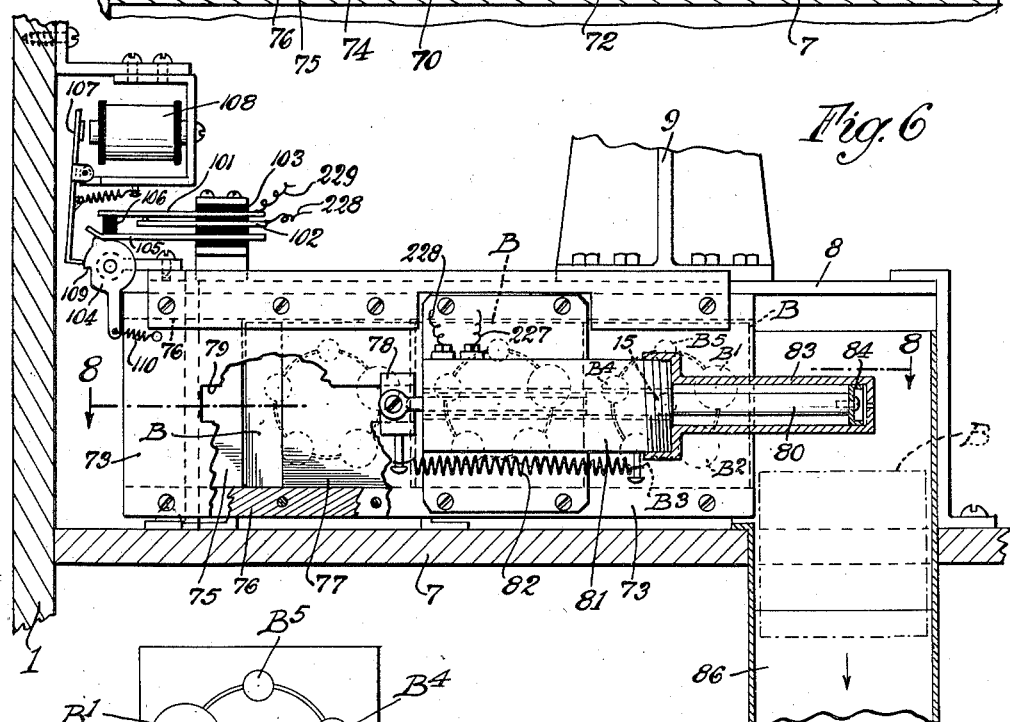
Figure 6 is a partial view similar to Figure 2 with parts in a different position.

When the hand controlled switch 85 is moved into closed position and the armature coil 81 is energized to move the slide 77, it will be understood that the operator should not be able to cause the ejection of more than one target, as only one complete score is to be recorded. Therefore, I provide a second control switch including the contacts 101 and 102 mounted in the insulating block 103. 104 is a cam disc pressing against a spring 105 and thereby against the insulating block 106 of the member 101 whereby, when the cam is in the position in which it is shown in Figure 2, the members 101 and 102 are separated. In the position there shown the armature 107 of the electromagnet 108 is allowed to drop into the notch 109 on the disc and hold it in the position in which it is there shown. The electromagnetic coil 108 is energized when the coin-operated switch 130 is actuated and this moves the armature 107 out of the slot 109 and permits the spring 110 to move the disc 104 into inoperative position, thus closing the switches 101 and 102 as shown in Figures 6 and 11. It will thereby be understood that whenever the slide 77 is moved to the left in response to actuation of the manual switch 85, it thereby breaks the switch formed by the members 101 and 102 and prevents any further target card release until after the next succeeding actuation of the coin controlled switch 130.

I may employ if I wish an additional means for rewarding accuracy by the delivery of a prize of any suitable nature. This is shown only diagrammatically in the wiring diagram of Figure 11 in connection with the enlargement 30 of the insulating block 27. An accurate hit at any one of the apertures 5a and following will thereby cause the excitement of one of the electromagnets 90a, 90b, 90c, 90d or 90e, having armatures 91a, 91b, 91c, 91d and 91e, and will thereby move it into opposition to a switch contact 92a, 92b, 92c, 92d or 92e, respectively.

In order to close the circuit through said various switches it is necessary that all the armatures 91a and following be moved into the closed position. When this is done a circuit is closed through the solenoid coil 93 which will move the solenoid plunger 94 and thereby any suitable member 95 which may be employed to release any suitable shutter or member in order to make a prize available to the user. The nature and detail of the prize are, of course, not part of the present invention.

In order to move the armatures 91a and following to initial open position, I provide the return member 97 associated with the plunger 98 within the solenoid coil 99 and normally held in inoperative position as by the spring 100. When the device is initially put into play as by the operation of the coin controlled switch 130, the coil 99 is energized and the member 97 is moved into switch breaking position and is thereafter returned by the spring 100 to inoperative position, leaving the various armatures 91a and following ready for actuation in response to the accuracy of the marksman.

Referring to the wiring diagram, Figure 11, a source of outside 110 volt current is indicated at 111, 112 although it will be understood that any suitable voltage may be employed and the device may be operated on direct current. However, for convenience, I illustrate it in connection with 110 volt alternating current. 113 indicates any suitable manually controlled switch whereby the entire circuit may be broken.

Referring first to a mechanism which is preferably located in a separate gun cabinet, diagrammatically indicated by the letter C, the line 111 may be traced to the primary coil 114 of the transformer T. A connecting line 115 extends from the power line 111 to the primary coil 116 of a transformer T' which supplies current of preferably lower voltage for various electrical parts associated with the operation of the device. The opposite end of the primary coil 116 is connected to a line 117 leading to a contact point 118 cooperating with a movable switch member 119 which is connected by means of a line 120 to the other power line 112. The secondary coil 121 of the transformer T' is connected by the lines 122 and 123 to the rectifier R.

When the device is not in operation the switch member 119 is held in open position, the dotted line position illustrated in Figure 11, by means of a rack bar 124 which is part of a mechanism of a shot counter S. A detent 125, pivoted as at 126 to the panel of the shot counter, is normally held in engagement with the teeth of the rack bar 124 by means of a spring 127. Cooperating with the detent 125 is a reset magnet 128 herein shown as including two electromagnets which may be electrically energized by manipulation of a coin slide 129 mounted on the gun cabinet C. The manually controlled coin operated coin slide 129 serves to move a switch member 130 in engagement with the switch contacts 131 and 132. Closure of the contact members 131 and 132 by the switch member 130 closes a circuit through the reset magnets 128 which may be traced from the power line 111 by a line 133 leading to the contact 131, a line 134 from the contact 132 extending to a light 135, thence through a line 136 to one side of the reset magnet 128. A line 137 continues from the opposite side of the reset magnet to the other power line 112. The light or bulb 135 merely serves as a voltage reducer for the reset electromagnets.

Connected to the line 134 as at 138 is a shunt connection 139 leading to the electromagnet 108 and continuing as at 140 to the solenoid 99. A line 141 and a line 142 connect the electromagnet 108 and the solenoid 99 with the power line 112. As will be seen, closure of the contacts 131 and 132 by the switch member 130 simultaneously energizes the reset magnet 128, the electromagnet 108 and the solenoid 99.

The reset magnet 128 when energized rotates the dog 125 out of engagement with the teeth of the rack bar 124 and the rack bar is free to be moved to the full line position of Figure 11 by a spring 143. The result is a closure of the movable switch member 119 with its opposed contact points 118 and 144 by means of a spring 145 to close the circuit through the transformer T' previously described and through the motor 18 which is connected by a line 146 with the contact 144 and a line 147 with the power line 111. The switch member 130 is returned to its initial position by a spring 148 as soon as the operator releases the coin slide 129, thus breaking the circuits through the reset magnet 128, the electromagnet 108 and the solenoid 99.

The switch member 130 then makes a connection between the contact members 150 and 151. The device is now ready for use and the operator may commence to shoot at the target 4. When the operator pulls the trigger 62a of the gun 60, which momentarily closes the switch 62, the following electrical circuits are completed. One of the circuits may be traced from the positive terminal of the rectifier R through the line 152, the line 153, a slow acting magnet 154, the lines 155, 156 to the switch 62, thence through the line 157 to the contacts 150 and 151, closed by the switch member 130; a line 158 completes the circuit to the negative terminal of the rectifier R. In addition, a shunt circuit is completed from the line 152 through the switch member 159 associated with the slow acting magnet 154, the line 160 leading to the solenoid 161 of the shot counter S, from which a line 162 extends to the line 156 leading to the switch 62 of the gun B.

Each time the trigger 62a is pulled, the shot counter solenoid 161 moves its plunger 163 towards the left, referring to Figure 11, and rotates a lever 164 counterclockwise about a pivot 165. A pawl 166, pivoted to the free end of the lever 164, in turn engages the rack bar 124 and moves it towards the right the distance of one tooth against the tension of the spring 143. The solenoid plunger further closes a multiple switch 168, for example by means of an abutment 169, and by means of the movable switch members 170, 171 and 172 in engagement with their respective switch contacts 173, 174 and 175, closes the following circuits.

First, holding or shunt circuits for the shot counter solenoid 161 and for the slow acting electromagnet 154 are completed through the switch member 170 in engagement with the contact 173 by shunting the lines 176 and 177 across the lines 162 and 158, respectively, at the intersecting points 178 and 179. The circuit for the slow acting electromagnet 154 is now traceable from the positive terminal of the rectifier R through the lines 152, 153, the slow acting electromagnet 154, lines 155, 162, intersecting point 178, line 176, contact 173, movable switch member 170, line 177, intersecting point 179, and the line 158 to the negative terminal of the rectifier R. Also, the parallel connected shot counter solenoid 161 is shunted across the power lines of the rectifier R by the switch member 170 by the switch 159 associated with the slow acting electromagnet 154, the line 160 leading to the shot counter solenoid 161, and the line 162 from the said shot counter solenoid, connected at the intersection point 178 to the line 176 of the contact 173.

The movable switch member 172 of the multiple switch 168, when in contact with its cooperating contact member 175, closes electrical circuits through a thud sounder solenoid 180 and through the transformer T for supplying power momentarily to illuminate the light source 61 in the gun 60 to project a flash of light, diagrammatically indicated by arrows 181 in Figure 11, towards the photoelectric cell 24 associated with the target structure previously described. The circuit for sounding the thud sounder for producing in effect the report of a shot, which may for example be produced by the movable plunger 182 striking a board 183, includes a line 184 connected to the main power line 111, the coil of the thud sounder solenoid 180, the lines 185, 186, the movable switch 172 in engagement with the contact 175, the lines 187, 188, 117, contact member 118, movable switch contact 119 and the line 120, which is connected to the other main power line 112.

The circuit through the transformer T is as follows. From the main power line 111 through the primary winding 114 of the transformer T, the line 190, the movable switch member 191 in engagement with the switch contact on the line 192, the line 186 leading to the movable switch member 172 of the multiple switch 168, thence through contact 175, lines 187, 188, 117, contact 118, movable switch member 119 and line 120, to the other main power line 112. The primary coil 114 of the transformer by induction energizes the secondary coil 193 and by means of the lines 194, 195 illuminates the light source 61 in the gun 60.

The movable switch members 191 and 159 open in unison in response to actuation of the slow acting electromagnet 154, but normally are held in closed relationship with their cooperating contacts on the lines 160, 192 by means of a spring 196.

Closure of the intermediate movable switch member 171 of the multiple switch 168 in response to actuation of the shot counter solenoid results in closing electrical shunt circuits for the primary windings 114 and 116 of the transformers T and T', respectively, and the thud sounder solenoid 180. However, its functions are primarily intended to be effective after a predetermined number of shots have been fired, and a description of its purpose will later appear.

The construction of the slow acting electromagnet 154 is such as to function to open the switch members 159 and 191 after the shot counter solenoid 161 has completed its operation of moving the rack bar 24 one step. Opening of the switch member 191 breaks the circuit of the transformer T. However, the interval between closure of the switch member 172 of the multiple switch 168 and consecutive opening of the switch 191 permits the gun lamp 61 to project momentarily a beam of light.

Opening of the switch member 159 breaks the electrical circuit through the shot counter solenoid 161 and a spring 198, interposed between the pawl 166 and any suitable abutment upon the panel of the shot counter S, returns the lever 164 and solenoid plunger 163 to its initial position, illustrated in Figure 11. Retrograde movement of the rack bar 124, slidably maintained in any suitable guiding bracket 199, in response to the tension of the spring 143, is prevented by the detent 125. In addition, the multiple switch 168 is returned to open position by a spring 200.

At each consecutive trigger pull of the gun, the rack bar 124 advances one step until, at the fifth trigger pull, assuming that the various parts of the device are proportioned and adjusted for five shots to complete a cycle of operation, the rack bar 124 moves the movable switch member 119 to the dotted line position of Figure 11 and breaks the connection with the contacts 118 and 144. The shunt connections established by the closure of the intermediate switch member 171 of the multiple switch 168 with the contact 174 continue to provide closed circuits of the transformers T and T' and the thud sounder solenoid 180, which previously had been partially closed, referring to the circuits of the transformer T and thud sounder solenoid 180, and completely closed in reference to the transformer T' by closure of the switch member 119 of the shot counter S.

The circuit of the primary winding 116 of the transformer T' may now be traced from the main power line 111 through lines 115, 117, intersecting point 201, lines 188, 202, contact 174, switch member 171, thence along the line 203 to the other main power line 112. The circuits of the thud sounder solenoid 180 and transformer T are shunted from their common line 187 connected to the contact 175 across the line 202, contact 174, switch 171 and wire 203, connected to the power line 112, until the slow acting electromagnet 154 again opens the switch members 159 and 191, thereby breaking the circuit of the shot counter solenoid 161, causing in turn the multiple switch 168 to be opened. The device is then rendered inoperative until the coin operated coin slide is again manipulated.

Assuming that during the cycle of operation the operator has been successful in obtaining a hit, that is to say, in hitting the photoelectric cell 24 with a flash of light from the gun light 61, the following electrical circuits are completed to energize the solenoid coil 81 and one of the electromagnets 90a and following, provided an accurate hit at any one of the apertures 5a and following has been made.

The photoelectric amplifier A which may be of any suitable standard construction is preferably continuously energized. Its circuit may be traced from the main power line 111, through the lines 210, 211 to the amplifier, thence through the line 212 which connects to the other power line 112 at intersection point 213. The amplifier functions to energize the photoelectric relay 214 when a flash of light from the gun light 61 impinges upon the photoelectric cell 24. The electrical connections between the amplifier A and photoelectric cell have previously been described.

The photoelectric relay 214 when energized closes a switch 215 and closes an electrical circuit through the solenoid 41 as follows: from the main power line 111 through lines 210, 216, spring finger 55, contact ring 51, and line 54 to the solenoid 41, thence through the line 53, contact ring 52, spring finger 56, lines 217, 218, photoelectric switch 215 and line 219, which connects at intersection point 213 to the other power line 112.

If a perfect hit has been scored, for example through the target aperture 5e with the spring arm 40 in engagement with the contact segment 31e, as illustrated in Figures 4 and 11, a further electrical circuit is established through the electromagnet 90e which may be traced from the main power line 111 through the line 220 and branch line 221e to the electromagnet 90e, thence through a line 222e, segment 31e, spring finger 40, lines 223, 218, photoelectric relay switch 215, and line 219 to the other power line 112. The various segments 31a and following are connected by lines 222a and following to their respective electromagnets 90a and following, which in turn are shunted by lines 221a and following to the line 220.

In the electric diagram of Figure 11 I have illustrated the line 223 connected to the spring member 40. In practice, however, the spring 40 for example may be grounded to the arm 20 and the line 223 may be grounded to the bracket 9 in order to eliminate an additional contact ring.

If five perfect hits have been made during one game, causing all five electromagnets 90a and following to be successively energized, an electrical circuit is made as follows. Note that the armature 91e is electrically connected to the switch contact 92d, the armature 91d to the contact 92c, the armature 91c to the contact 92b, and the armature 91b to the contact 92a. The power line 111 is connected by a line 224 to the contact 92e thence the circuit continues through the several armatures 91a and following and cooperating contacts 92a and following to the solenoid coil 93 which is connected by a line 225 with the armature 91a; thence the circuit is completed by the line 226 which is connected at intersecting point 213 to the other power line 112.

The circuit for energizing the solenoid coil 81 by means of the manually controlled switch button 85 for ejecting the scored target may be traced from the main power line 111 through the line 210, push button 85, line 227, to the solenoid coil 81, thence through a line 228, contact members 102, 101, and line 229 to the other power line 112.

Obviously I may employ voltage reducing means, such as transformers, etc., for some of the electrical apparatus illustrated in the wiring diagram of Figure 11.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic rather than as limiting me to my precise showing.

For example, I do not wish to be limited to any particular marking device. I have shown an inking marker but clearly a sharp point or an indenting or card roughening means could be employed.

Whereas I have described and shown a card of paper, fiber or the like, it will be understood that other materials may be employed such as wood or metal. What is essential is that I provide a permanent and accurate record of the score or aim of the operator.

It will also be understood that whereas I show a stack of cards, I might employ a continuous roll of paper or other suitable material, with means for cutting off the end after the printing or marking operation has taken place.

The use and operation of my device are as follows:

When the device is put in play by the operation of the coin control slide 129, the marksman can take five shots or pull the trigger 62a five times before the shot limit mechanism above described renders the machine inoperative. It is his purpose to strike the photo cell 24 with a flash of light at a time when the photo cell is centered in one or another of the apertures 5a and following. If the cell is off-center in relation to such aperture when hit, the plunger 42 will make a mark on the target B and this mark will correspond to the position of the cell when hit and will therefore indicate the accuracy or lack of accuracy of the shooter.

As an example, if the operator is able to hit the photo cell with a flash of light with each shot at a time when the cell is centered with a different aperture, then the member B would be delivered along the chute 86 and would illustrate a perfect score with an indicating mark centered in each of the circles B1, B2, etc. The arcs 6 may be useful for assisting the marksman in knowing when to shoot as he can thereby follow the movement of the cell for example by observing the color of the ring 26 or the appearance of the cell or the lens 25.

In any case, wherever he hits, the plunger 42 will indicate accurately the relationship of the cell to the particular aperture in the target at which the operator was shooting. If the cell is struck when it is passing around one of the arcs 6 that would also be indicated on the target. If there is a complete miss and the cell is not excited, then for that particular shot or trigger pull there will be no mark on the record card.

I claim:

1. In a target device, a generally opaque fixed target member, a rotor, a photosensitive member mounted on said rotor, and means for rotating said rotor, said fixed target member having a plurality of areas positioned along the path of movement of said photosensitive member, through which the photosensitive member is visible to a marksman positioned forwardly of said fixed target member, said areas being arranged concentrically of the path of rotation of said rotor.

2. In a target device, a generally opaque fixed target member, a rotor, a photosensitive member mounted on said rotor, and means for rotating said rotor, said fixed target member having a plurality of areas positioned along the path of movement of said photosensitive member, through which the photosensitive member is visible to a marksman positioned forwardly of said fixed target member, said areas being of varying size.

3. In a target device, a plurality of rotatable members and means for rotating them in unison, a photosensitive element operatively associated with one of said rotating members, marking means mounted on the other, a score recording device, means to position it in alinement with said marking means, said marking means including an electromagnetic coil and an armature, and means for energizing said electromagnetic coil when the photosensitive element is struck by a flash of light.

4. In a target device, a plurality of rotatable members and means for rotating them in unison, a photosensitive element operatively associated with one of said rotating members, marking means mounted on the other, a score recording device, means to position it in alinement with said marking means, said marking means including an electromagnetic coil and an armature, and means for energizing said electromagnetic coil when the photosensitive element is struck by a flash of light.

5. In a target device, a generally opaque target face having a plurality of spaced apertures, a movable member located rearwardly of said face, a photosensitive element mounted on said movable member, means for moving said member whereby said photosensitive element is alined in succession with said apertures, and aimable means for projecting a flash of light at said target face whereby, when said photosensitive element is alined with one of said apertures, it may be struck by a properly aimed flash of light.

6. In a target device, a generally opaque target face having a plurality of spaced apertures, a movable member located rearwardly of said face, a photosensitive element mounted on said movable member, means for moving said member whereby said photosensitive element is alined in succession with said apertures, and aimable means for projecting a flash of light at said target face whereby, when said photosensitive element is alined with one of said apertures, it may be struck by a properly aimed flash of light, said apertures being of varying size.

7. In a target device, a generally opaque target face having a plurality of spaced apertures, a movable member located rearwardly of said face, a photosensitive element mounted on said movable member, means for moving said member whereby said photosensitive element is alined in succession with said apertures, aimable means for projecting a flash of light at said target face whereby, when said photosensitive element is alined with one of said apertures, it may be struck by a properly aimed flash of light, a miniature score recording target having a plurality of indicating areas corresponding in location to said apertures, means for marking said miniature target to indicate the aim of the operator, and means for discharging such miniature target from the target device, after it is marked.

8. In a target device, a generally opaque target face having a plurality of spaced apertures, a movable member located rearwardly of said face, a photosensitive element mounted on said movable member, means for moving said member whereby said photosensitive element is alined in succession with said apertures, aimable means for projecting a flash of light at said target face whereby, when said photosensitive element is alined with one of said apertures, it may be struck by a properly aimed flash of light, said apertures being of varying size, a miniature score recording target having a plurality of indicating areas corresponding in relative size and location to said apertures, means for marking said miniature target to indicate the aim of the operator, and means for discharging such miniature target from the target device after it is marked.

9. In a target device, a generally opaque target face, a rotor and means for rotating it, a photosensitive member mounted on said rotor eccentrically of its center of rotation, said target face having a plurality of apertures located forwardly of the path of movement of the photosensitive element, and aimable means for projecting a flash of light at said target face whereby, when said photosensitive element is alined with one of said apertures, it may be struck by a properly aimed flash of light.

10. In a target device, a generally opaque target face, a rotor and means for rotating it, a photosensitive member mounted on said rotor eccentrically of its center of rotation, said target face having a plurality of apertures located forwardly of the path of movement of the photosensitive element, aimable means for projecting a flash of light at said target face whereby, when said photosensitive element is alined with one of said apertures, it may be struck by a properly aimed flash of light, and means for limiting the number of flashes the operator can project to a number equal to the number of said apertures.

11. In a target device, a generally opaque target face having a plurality of spaced apertures, a movable member located rearwardly of said face, a photosensitive element mounted on said movable member, means for moving said member whereby said photosensitive element is alined in succession with said apertures, aimable means for projecting a flash of light at said target face whereby, when said photosensitive element is alined with one of said apertures, it may be struck by a properly aimed flash of light, and means for limiting the number of flashes the operator can project to a number equal to the number of said apertures.

12. In a target device, a generally opaque target face, a rotor and means for rotating it, a photosensitive member mounted on said rotor eccentrically of its center of rotation, said target face having a plurality of apertures located forwardly of the path of movement of the photosensitive element, and aimable means for projecting a flash of light at said target face whereby, when said photosensitive element is alined with one of said apertures, it may be struck by a properly aimed flash of light, said rotor including a hub, a generally radial arm on one side of said hub, the photosensitive member being mounted on said arm, and a counterweight on the opposite side of said hub.

13. In a target device, a rotor and means for rotating it, a photosensitive member mounted on said rotor eccentrically of its center of rotation, a target face about which said rotor is movable, a miniature score indicating target corresponding to said target face, an inking member opposed thereto, means for imparting to said inking member a movement across said miniature target corresponding to the movement of the photosensitive element in relation to said target face, means for actuating said inking member when the photosensitive element is struck by a flash of light, and for thereby indicating the aim of the operator, and means for dispensing said miniature target.

14. In a target device, a target face and a corresponding miniature score indicating target, said miniature target being marked in accordance with the markings of the target face, a rotor alined with said target face, a second rotor alined with said miniature target, a photosensitive element eccentrically mounted on said first mentioned rotor, a marking member eccentrically mounted on said last mentioned rotor, means for rotating said rotors in unison at a like rotational speed, and means for actuating said marking member when said photosensitive element is struck by a flash of light and for thereby recording on said miniature target the aim of the operator, and means for dispensing said miniature target.

15. In a target device, a target face, a miniature score indicating target, said face and miniature target being correspondingly marked, a rotor alined with the target face, a second rotor alined with a miniature target, a target element eccentrically mounted on the first mentioned rotor, a marking member eccentrically mounted on the last mentioned rotor, means for rotating said rotors in unison, at a like rotational speed, means for actuating said marking member when the target element is struck, and for thereby indicating on the miniature target the aim of the operator, and means for dispensing said miniature target.

16. In a target device, a generally opaque target face and a miniature score indicating target, said face and miniature target being correspondingly marked, a rotor alined with the rear of the target face, a second rotor alined with the miniature target, a target element eccentrically mounted on said first mentioned rotor, a marking member eccentrically mounted on the last mentioned rotor, means for rotating said rotors in unison at a like rotational speed, said target face being provided with a plurality of apertures alined along the path of movement of said target element, means for actuating said marking member when the target element is struck when in alinement with one of said apertures, and for thereby indicating on the miniature target the aim of the operator, and means for dispensing said miniature target.

FRANK SMARDO.